United States Patent [19]

Mülhaupt et al.

[11] Patent Number: 5,045,577
[45] Date of Patent: Sep. 3, 1991

[54] PROCESS FOR THE PREPARATION OF HEAT-STABLE OLEFIN POLYMERS

[75] Inventors: Rolf Mülhaupt; Paul Dubs, both of Marly, Switzerland

[73] Assignee: Ciba-Geigy Corporation, Ardsley, N.Y.

[21] Appl. No.: 369,428

[22] Filed: Jun. 21, 1989

[30] Foreign Application Priority Data

Jun. 30, 1988 [CH] Switzerland ............... 2501/88-5

[51] Int. Cl.$^5$ ............... C08K 5/5393; C08K 5/524
[52] U.S. Cl. .................................. 524/99; 524/100; 524/101; 524/102; 524/126; 524/151; 526/204
[58] Field of Search ............ 524/99, 100, 101, 102, 524/151, 126; 526/128, 204

[56] References Cited

U.S. PATENT DOCUMENTS

| 4,111,835 | 9/1978 | Foschini et al. | |
|---|---|---|---|
| 4,399,054 | 8/1983 | Ferraris et al. | |
| 4,824,885 | 4/1989 | Magni et al. | |
| 4,853,426 | 8/1989 | Chatterjee | 524/101 |
| 4,879,141 | 11/1989 | Chatterjee | 524/101 |
| 4,960,593 | 10/1990 | Sevini et al. | 524/99 |

FOREIGN PATENT DOCUMENTS

| 192987 | 9/1986 | European Pat. Off. |
|---|---|---|
| 0045977 | 1/1988 | European Pat. Off. |
| 254348 | 1/1988 | European Pat. Off. |

OTHER PUBLICATIONS

Research Disclosure No. 112, 85–91 (Aug. 1973).
Chem. Abst. vol. 105, Abstract No. 134505p. (1986).

Primary Examiner—Veronica P. Hoke
Attorney, Agent, or Firm—JoAnn Villamizar

[57] ABSTRACT

The addition of hindered amines in combination with a phosphorus-III-ester to the polymerization of olefins on spherical Ziegler-Natta catalysts effects a thermo-oxidative stabilization of the prepared polymers. Phenolic antioxidants may be used additionally.

14 Claims, No Drawings

PROCESS FOR THE PREPARATION OF HEAT-STABLE OLEFIN POLYMERS

The invention relates to a process for the preparation of olefin polymers stable to heat and oxidation, by the addition of a plurality of stabilizers to the polymerization. The invention also relates to the stabilized olefin polymers thus prepared.

The low-pressure polymerization of olefins by means of organometallic complex catalysts (for example Ziegler-Natta catalysts) usually results in a finely pulverulent polymer, which is granulated in an extruder before being processed by shaping. Stabilizers and/or other processing aids are added to the polymer in the course of this granulation.

It has recently become possible, by using solid supported catalysts, to prepare polymers in spherical granules which no longer have to be granulated by extrusion, but can be processed directly. In particular, spherical magnesium halide of a specific particle size has proved suitable as supports for these solid catalysts, as is described, for example, in DE-A 2,641,960. With $TiCl_4$ and electron donors the anhydrous magnesium halide forms insoluble complexes which are then activated by means of aluminium alkyls. The stereospecivity and activity is intensified by the con-comitant use of electron donors, for example carboxylic acid esters or compounds having Si-O-C bonds, as described, for example, in EP-A 45,977.

The fact that the polymers thus obtained are no longer granulated has led to the wish to add stabilizers, which are important for processing, as early as at the polymerization stage. The usual processing stabilizers are antioxidants of the sterically hindered phenol type. The addition of these to the olefin polymerization causes often problems in the polymerization and also discoloration of the polymers. It has recently been found (EP-A 192,987) that sterically hindered amine stabilizers of the polyalkylpiperidine type do not cause problems in the polymerization and do not appreciably discolour the polymer and effect a good stabilization to heat and oxidation.

It has now been found, surprisingly, that the action of these piperidine stabilizers can be increased if phosphorus-III esters are added as co-stabilizers. Especially the processing stability is increased. When phosphorus compounds of this type are added, it is also possible to add the antioxidants of the sterically hindered phenol type, without discoloration resulting. By adding such antioxidants the life-time of the phosphorus-III esters can be prolonged.

The invention therefore relates to a process for the preparation of olefin polymers stable to heat and oxidation by polymerization on a solid catalyst obtained by reaction of an aluminium alkyl with a solid product comprising a magnesium dihalide in active form and a titanium compound, which process comprises adding to the polymerization zone at least one 2,2,6,6-tetramethylpiperidine compound as a stabilizer and at least one phosphorus-III ester as a co-stabilizer.

The olefins polymerized in this process are ethylene and α-olefins, for example propylene, 1-butene, 4-methyl-1-pentene or 5-methyl-1-hexene, and also mixtures of olefins, for example ethylene/propylene or propylene mixed with minor amounts of higher α-olefins. The process is of particular interest for the polymerization and copolymerization of propylene.

The polymerization catalysts used are solid catalysts. They compare an anhydrous magnesium dihalide in active form and a titanium compound. For magnesium dihalide in active form it is meant a dihalide in the X-ray spectrum of which the most intense reflection line shows a broadening compared to the line of the corresponding halide in the inactive form or the line is replaced by a halo shifted with respect to the position of said line. The magnesium dihalide preferably used is a magnesium dichloride or dibromide. The titanium compound preferably contains at least one Ti-halogen bond, the most preferred compound is titanium tetrachloride.

The titanium compound can be used in combination with an electron donor, for example a carboxylic acid ester, as described in EP-A 45,977.

After the reaction of the magnesium halide compound with the titanium compound and possibly the electron donor, the excess titanium compound and the excess electron donor is advantageously extracted by washing with an inert solvent, for example with hexane or heptane.

The catalyst thus prepared is activated by reaction with an aluminium alkyl compound which is preferably used in the form of a solution in an alkane. Examples of aluminium alkyls are $Al(C_2H_5)_3$ or $Al(C_4H_9)_3$. In case of stereoregular polymerization of alpha-olefins it is convenient to add an electron donor, for example an organic silicon compound containing at least one Si—O—C bond, as described, for example, in EP-A 45,977. Examples of silicon compounds of this type are phenyltriethoxysilane, phenyltrimethoxysilane, diphenyldimethoxysilane, methyltriethoxysilane, dimethyldiethoxysilane or ethyltrimethoxysilane.

The polymerization with these catalysts can be carried out, according to known methods, in the liquid phase or in the gas phase. The liquid may be an alkane or the monomeric olefin itself.

The stabilizers can be added to the polymerization medium before the polymerization, during the polymerization or at the end of the polymerization. In accordance with the invention at least two stabilizers are added, namely a 2,2,6,6-tetramethylpiperidine compound and a phosphorus-III ester.

The piperidine compounds belong to the sterically hindered amines, which are known, in particular, as light stabilizers, but here act primarily as antioxidants, i.e. impart to the polymer stability to heat and oxidation. These compounds contain one or more groups of the formula I

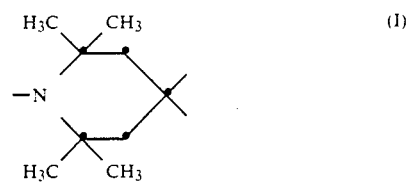

The compounds can have a relatively low molecular weight (<700) or a fairly high molecular weight. In the latter case they can also be oligomeric or polymeric products.

The following classes of tetramethylpiperidine compounds in particular are of importance as stabilizers.

a) Compounds of the formula II

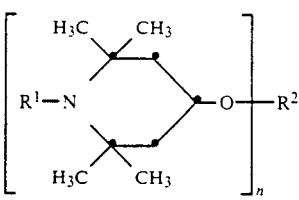

(II)

in which n is a number from 1 to 4, preferably 1 or 2, $R^1$ is hydrogen, oxyl, $C_1$–$C_{12}$alkyl, $C_3$–$C_8$alkenyl, $C_3$–$C_8$alkynyl, $C_7$–$C_{12}$aralkyl, $C_1$–$C_8$alkanoyl, $C_3$–$C_5$alkenoyl, glycidyl or a group —CH$_2$CH(OH)—Z in which Z is hydrogen, methyl or phenyl, $R^1$ being preferably $C_1$–$C_4$alkyl, allyl, benzyl, acetyl or acryloyl, and, if n is 1, $R^2$ is hydrogen, $C_1$–$C_{18}$alkyl alkyl which is uninterrupted or interrupted by one or more oxygen atoms, cyanoethyl, benzyl, glycidyl, a monovalent radical of an aliphatic, cycloaliphatic, araliphatic, unsaturated or aromatic carboxylic acid, carbamic acid or acid containing phosphorus or is a monovalent silyl radical, preferably a radical of an aliphatic carboxylic acid having 2–18 C atoms, of a cycloaliphatic carboxylic acid having 7 to 15 C atoms, of an , -unsaturated carboxylic acid having 3 to 5 C atoms or of an aromatic carboxylic acid having 7 to 15 C atoms, and, if n is 2, $R^2$ is $C_1$–$C_{12}$alkylene, $C_4$–$C_{12}$alkenylene, xylylene, a divalent radical of an aliphatic, cycloaliphatic, araliphatic or aromatic dicarboxylic acid, dicarbamic acid or acid containing phosphorous or is a divalent silyl radical, preferably a radical of an aliphatic dicarboxylic acid having 2 to 36 C atoms, of a cycloaliphatic or aromatic dicarboxylic acid having 8–14 C atoms or of an aliphatic, cycloaliphatic or aromatic dicarbamic acid having 8–14 C atoms, and, if n is 3, $R^2$ is a trivalent radical of an aliphatic, cycloaliphatic or aromatic tricarboxylic acid, of an aromatic tricarbamic acid or of an acid containing phosphorus or is a trivalent silyl radical, and, if n is 4, $R^2$ is a tetravalent radical of an aliphatic, cycloaliphatic or aromatic tetracarboxylic acid.

If any substituents are $C_1$–$C_{12}$alkyl they are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

When $R^1$ or $R^2$ is $C_1$–$C_{18}$alkyl, they can, for example, be the groups listed above and, in addition thereto, for example, n-tridecyl, n-tetradecyl, n-hexadecyl or n-octadecyl.

Examples of $R^1$ as $C_3$–$C_8$alkenyl are 1-propenyl, allyl, methallyl, 2-butenyl, 2-pentenyl, 2-hexenyl, 2-octenyl and 4-tert-butyl-2-butenyl.

A $C_3$–$C_8$alkinyl $R^1$ is preferably propargyl.

A $C_7$–$C_{12}$aralkyl $R^1$ is especially phenethyl and in particular benzyl.

Examples of $R^1$ as $C_1$–$C_8$alkanoyl are formyl, propionyl, butyryl and octanoyl, but preferably acetyl, and as $C_3$–$C_5$alkenoyl, $R^1$ is especially acryloyl.

Examples of $R^2$ as a monovalent radical of a carboxylic acid are an acetic acid, caproic acid, stearic acid, acrylic acid, methacrylic acid, benzoic acid or β-(3,5-di-tert-butyl-4-hydroxyphenyl)-propionic acid radical.

Examples of $R^2$ as a divalent radical of a dicarboxylic acid are a malonic acid, succinic acid, glutaric acid, adipic acid, suberic acid, sebacic acid, maleic acid, phthalic acid, dibutylmalonic acid, dibenzylmalonic acid, butyl-(3,5-di-tert-butyl-4-hydroxybenzyl)-malonic acid or bicycloheptenedicarboxylic acid radical.

Examples of $R^2$ as a trivalent radical of a tricarboxylic acid are a trimellitic acid or a nitrilotriacetic acid radical.

Examples of $R^2$ as a tetravalent radical of a tetracarboxylic acid are the tetravalent radical of butane-1,2,3,4-tetracarboxylic acid or of pyromellitic acid.

Examples of $R^2$ as a divalent radical of a dicarbamic acid are a hexamethylenedicarbamic acid or a 2,4-toluylenedicarbamic acid radical.

The following compounds are examples of polyalkylpiperidine compounds of this class:

1) 4-Hydroxy-2,2,6,6-tetramethylpiperidine
2) 1-Allyl-4-hydroxy-2,2,6,6-tetramethylpiperidine
3) 1-Benzyl-4-hydroxy-2,2,6,6-tetramethylpiperidine
4) 1-(4-tert-Butyl-2-butenyl)-4-hydroxy-2,2,6,6-tetramethylpiperidine
5) 4-Stearoyloxy-2,2,6,6-tetramethylpiperidine
6) 1-Ethyl-4-salicyloyloxy-2,2,6,6-tetramethylpiperidine
7) 4-Methacryloyloxy-1,2,2,6,6-pentamethylpiperidine
8) 1,2,2,6,6-Pentamethylpiperidin-4-yl B-(3,5-di-tert-butyl-4-hydroxy phenyl)-propionate
9) Di-(1-benzyl-2,2,6,6-tetramethylpiperidin-4-yl) maleate
10) Di-(2,2,6,6-tetramethylpiperidin-4-yl) succinate
11) Di-(2,2,6,6-tetramethylpiperidin-4-yl) glutarate
12) Di-(2,2,6,6-tetramethylpiperidin-4-yl) adipate
13) Di-(2,2,6,6-tetramethylpiperidin-4-yl) sebacate
14) Di-(1,2,2,6,6-pentamethylpiperidin-4-yl) sebacate
15) Di-(1,2,3,6-tetramethyl-2,6-diethyl-piperidin-4-yl) sebacate
16) Di-(1-allyl-2,2,6,6-tetramethylpiperidin-4-yl) phthalate
17) 1-Propargyl-4-B-cyanoethoxy-2,2,6,6-tetramethylpiperidine
18) 1-Acetyl-2,2,6,6-tetramethylpiperidin-4-yl acetate
19) Tri-(2,2,6,6-tetramethylpiperidin-4-yl) trimellitate
20) 1-Acryloyl-4-benzyloxy-2,2,6,6-tetramethylpiperidine
21) Di-(2,2,6,6-tetramethylpiperidin-4-yl) diethylmalonate
22) Di-(1,2,2,6,6-pentamethylpiperidin-4-yl) dibutylmalonate
23) Di-(1,2,2,6,6-pentamethylpiperidin-4-yl) butyl-(3,5-di-tert-butyl-4-hydroxybenzyl)-malonate
24) Di-(1,2,2,6,6-pentamethylpiperidin-4-yl) dibenzylmalonate
25) Di-(1,2,3,6-tetramethyl-2,6-diethyl-piperidin-4-yl) dibenzylmalonate
26) Hexane-1',6'-bis-(4-carbamoyloxy-1-n-butyl-2,2,6,6-tetramethylpiperidine)
27) Toluene-2',4'-bis-(4-carbamoyloxy-1-n-propyl-2,2,6,6-tetramethylpiperidine)
28) Dimethyl-bis-(2,2,6,6-tetramethylpiperidin-4-oxy)-silane
29) Phenyl-tris-(2,2,6,6-tetramethylpiperidin-4-oxy)-silane
30) Tris-(1-propyl-2,2,6,6-tetramethylpiperidin-4-yl) phosphite
31) Tris-(1-propyl-2,2,6,6-tetramethylpiperidin-4-yl) phosphite
32) Phenyl-bis-(1,2,2,6,6-pentamethylpiperidin-4-yl) phosphonate
33) 4-Hydroxy-1,2,2,6,6-pentamethylpiperidine
34) 4-Hydroxy-N-hydroxethyl-2,2,6,6-tetramethylpiperidine 35) 4-Hydroxy-N-(2hydroxypropyl)-2,2,6,6-tetramethylpiperidine
36) 1-Glycidyl-4-hydroxy-2,2,6,6-tetramethylpiperidine b) Compounds of the formula (III)

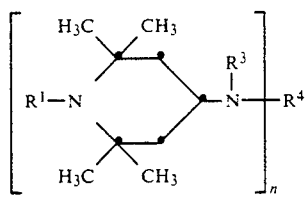

in which n is the number 1 or 2, $R^1$ is as defined under a), $R^3$ is hydrogen, $C_1$-$C_{12}$alkyl, $C_2$-$C_5$hydroxyalkyl, $C_5$-$C_7$cycloalkyl, $C_7$-$C_8$aralkyl, $C_2$-$C_{18}$alkanoyl, $C_3$-$C_5$alkenoyl or benzoyl, and, if n is 1, $R^4$ is hydrogen, $C_1$-$C_{18}$alkyl, $C_3$-$C_8$alkenyl, $C_5$-$C_7$cyclo-alkyl, $C_1$-$C_4$alkyl which is substituted by a hydroxyl, cyano, alkoxy-carbonyl or carbamide group, glycidyl or a group of the formula $-CH_2-CH(OH)-Z$ or of the formula $-CONH-Z$ in which Z is hydrogen, methyl or phenyl; if n is 2, $R^4$ is $C_2$-$C_{12}$alkylene, $C_6$-$C_{12}$arylene, xylylene, a group $-CH-CH(OH)-CH_2$ or a group $-CH_2-CH(OH)-CH_2-O-D-O$ in which D is $C_2$-$C_{10}$alkylene, $C_6$-$C_{15}$arylene or $C_6$-$C_{12}$cycloalkylene, or, provided that $R^3$ is not alkanoyl, alkenoyl or benzoyl, $R^4$ can also be a divalent radical of an aliphatic, cycloaliphatic or aromatic dicarboxylic acid or dicarbamic acid or the group $-CO-$, or, if n is 1, $R^3$ and $R^4$ together can be the divalent radical of an aliphatic, cycloaliphatic or aromatic 1,2-dicarboxylic or 1,3-dicarboxylic acid.

If any substituents are $C_1$-$C_{12}$alkyl or $C_1$-$C_{18}$alkyl they are as already defined under a).

If any substituents are $C_5$-$C_7$cycloalkyl, they are, in particular, cyclohexyl.

A $C_7$-$C_8$aralkyl $R^3$ is in particular phenylethyl or especially benzyl.

A $C_2$-$C_5$hydroxyalkyl $R^3$ is in particular 2-hydroxyethyl or 2-hydroxypropyl.

Examples of $R^3$ as $C_2$-$C_{18}$alkanoyl are propionyl, butyryl, octanoyl, dodecanoyl, hexadecanoyl or octadecanoyl, but preferably acetyl, and, as $C_3$-$C_5$alkenoyl, $R^3$ is especially acryloyl.

Examples of $R^4$ as $C_2$-$C_8$alkenyl are allyl, methallyl, 2-butenyl, 2-pentenyl, 2-hexenyl or 2-octenyl.

Examples of $R^4$ as $C_1$-$C_4$alkyl substituted by a hydroxyl, cyano, alkoxycarbonyl or carbamide group can be 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)-ethyl.

If any substituents are $C_2$-$C_{12}$alkylene, they are, for example, ethylene, propylene, 2,2-dimethylpropylene, tetramethylene, hexamethylene, octamethylene, decamethylene or dodecamethylene.

If any substituents are $C_6$-$C_{15}$arylene, they are, for example, o-, m- or p-phenylene, 1,4-naphthylene or 4,4'-biphenylene.

As $C_6$-$C_{12}$cycloalkylene, D is especially cyclohexylene.

the following compounds are examples of polyalkylpiperidine compounds of this class:

37) N,N'-Bis-2,2,6,6-tetramethylpiperidin-4-yl)-hexamethylene-1,6-diamine
38) N,N'-Bis-2,2,6,6-tetramethylpiperidin-4-yl)-hexamethylene-1,6-diacetamide
39) 1-Acetyl-4-(N-cyclohexylacetamido)-2,2,6,6-tetramethylpiperidine
40) 4-Benzoylamino-2,2,6,6-tetramethylpiperidine
41) N,N'-Bis-(2,2,6,6-tetramethylpiperidin-4-yl)-N,N'-dibutyladipamide
42) N,N'-Bis-(2,2,6,6-tetramethylpiperidin-4-yl)-N,N'-dicyclohexyl-2-hydroxypropylene-1,3-diamine
43) N,N'-Bis-(2,2,6,6-tetramethylpiperidin-4-yl)-p-xylylene-diamine
44) N,N'-Bis-(2,2,6,6-tetramethylpiperidin-4-yl)-succindiamide
45) Di-(2,2,6,6-tetramethylpiperidin-4yl) N-(2,2,6,6-tetramethylpiperidin-4yl)-β-aminodipropionate
46) The compound of the formula

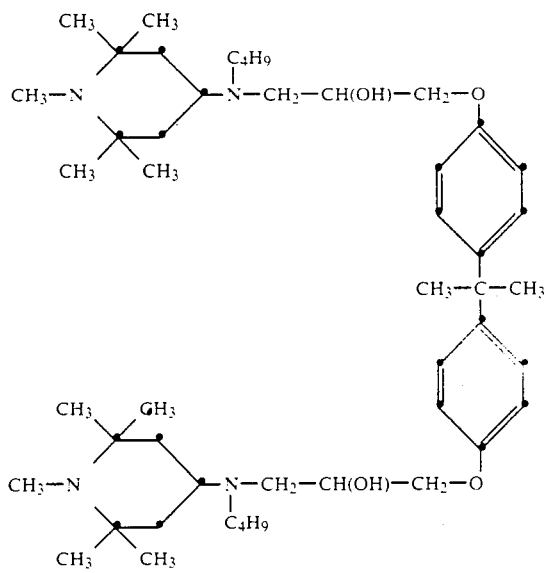

47) 4-(Bis-2-hydroxyethyl-amino)-1,2,2,6,6-pentamethylpiperidine
48) 4-(3Methyl-4-hydroxy-5-tert-butylbenzamido)-2,2,6,6-tetramethylpiperidine
49) 4-Methacrylamido-1,2,2,6,6-pentamethylpiperidine c) Compounds of the formula (IV)

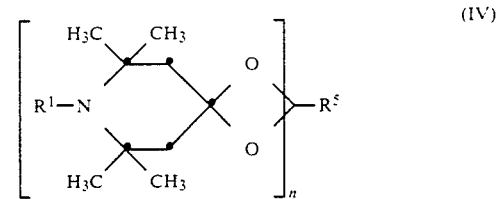

in which n is the number 1 or 2, $R^1$ is as defined under a), and, if n is 1, $R^5$ is $C_2$-$C_8$alkylene or $C_2$-$C_8$hydroxyalkylene or $C_4$-$C_{22}$acyloxyalkylene and, if n is 2, $R^5$ is the group $(-CH_2)_2C(CH_2-)_2$.

Examples of $R^5$ as $C_2$-$C_8$alkylene or $C_2$-$C_8$hydroxyalkylene are ethylene, 1-methylethylene, propylene, 2-ethylpropylene or 2-ethyl-2-hydroxymethylpropylene.

An example of $R^5$ as $C_4$-$C_{22}$acyloxyalkylene is 2-ethyl-2-acetoxymethylpropylene.

The following compounds are examples of polyalkylpiperidine compounds of this class:

50) 9-Aza-8,8,10,10-tetramethyl-1,5-dioxaspiro[5.5]undecane
51) 9-Aza-8,8,10,10-tetramethyl-3-ethyl-1,5-dioxaspiro[5.5]undecane
52) 8-Aza-2,7,7,8,9,9-hexamethyl-1,4-dioxaspiro[4.5]decane
53) 9-Aza-3-hydroxymethyl-3-ethyl-8,8,9,10,10-pentamethyl-1,5-dioxaspiro[5.5]undecane
54) 9-Aza-3-ethyl-3-acetoxymethyl-9-acetyl-8,8,10,10-tetramethyl-1,5-dioxaspiro[5.5]undecane
55) 2,2,6,6-Tetramethylpiperidine-4-spiro-2'-(1',3'-dioxane)-5'-spiro-5''-(1'',3''-dioxane)-2''-spiro-4'''-(2''',2''',6''',6'''-tetramethylpiperidine).

d) Compounds of the formulae VA, VB and VC

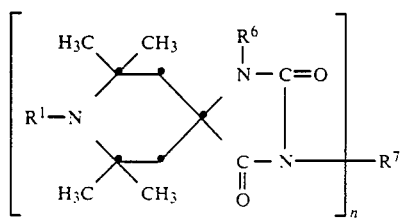
(VA)

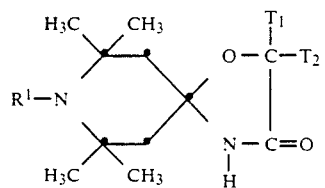
(VB)

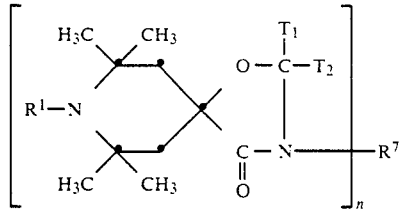
(VC)

in which n is the number 1 or 2, $R^1$ is as defined under a), $R^6$ is hydrogen, $C_1$–$C_{12}$alkyl, allyl, benzyl, glycidyl or $C_2$–$C_6$alkoxyalkyl, and, if n is 1, $R^7$ is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$-alkoxyalkyl, $C_6$–$C_{10}$aryl, glycidyl or a group of the formula —$(CH_2)_p$—COO—Q or of the formula —$(CH_2)_p$—O—CO—Q in which p is 1 or 2 and q is $C_1$–$C_4$alkyl or phenyl, and, if n is 2, $R^7$ is $C_2$–$C_{12}$-alkylene, $C_4$–$C_{12}$alkenylene, $C_6$–$C_{12}$aralylene, a group —$CH_2$—CH(OH)—$CH_2$—O—D—O—$CH_2$—CH(OH)—$CH_2$—, in which D is $C_2$–$C_{10}$-alkylene, $C_6$–$C_{15}$arylene or $C_6$–$C_{12}$cycloalkylene, or a group —$CH_2CH(OZ')CH_2$—$(OCH_2$—CH(OZ')$CH_2)_2$— in which Z' is hydrogen, $C_1$–$C_{18}$alkyl, allyl, benzyl, $C_2$–$C_{12}$alkanoyl or benzoyl, $T_1$ and $T_2$ independently of one another are hydrogen, $C_1$–$C_{18}$alkyl or $C_6$–$C_{10}$aryl or $C_7$–$C_9$aralkyl each of which is unsubstituted or substituted by halogen or $C_1$–$C_4$alkyl, or $T_1$ and $T_2$, together with the C atom linking them, form a $C_5$–$C_{12}$cycloalkane ring.

If any substituents are $C_1$–$C_{12}$alkyl they are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Examples of any $C_1$–$C_{18}$alkyl substituents can be the groups listed above and, additionally thereto, n-tridecyl, n-tetradecyl, n-hexadecyl or n-octadecyl.

If any substituents are $C_2$–$C_6$alkoxyalkyl, they are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

Examples of $R^7$ as $C_3$–$C_5$alkenyl are 1-propenyl, allyl, methallyl, 2-butenyl or 2-pentenyl.

As $C_7$–$C_9$aralkyl, $R^7$, $T_1$ and $T_2$ are especially phenethyl or, in particular, benzyl. If $T_1$ and $T_2$, together with the C atom, form a cycloalkane ring, this can be, for example, a cyclopentane, cyclohexane, cyclooctane or cyclododecane ring.

Examples of $R^7$ as $C_2$–$C_4$hydroxyalkyl are 2-hydroxyethyl, 2-hydroxypropyl, 2-hydroxybutyl or 4-hydroxybutyl.

As $C_6$–$C_{10}$aryl, $R^7$, $T_1$ and $T_2$ are especially phenyl, α-naphthyl or β-naphthyl which are unsubstituted or substituted by halogen or $C_1$–$C_4$alkyl.

Examples of $R^7$ as $C_2$–$C_{12}$alkylene are ethylene, propylene, 2,2-dimethylpropylene, tetramethylene, hexamethylene, octamethylene, decamethylene or dodecamethylene.

As $C_4$–$C_{12}$alkenylene, $R^7$ is especially 2-butenylene, 2-pentenylene or 3-hexenylene.

Examples of $R^7$ as $C_6$–$C_{12}$arylene are o-, m- or p-phenylene, 1,4-naphthylene or 4,4'-biphenylene.

Examples of Z' as $C_2$–$C_{12}$alkanoyl are propionyl, butyryl, octanoyl or dodecanoyl, but preferably acetyl.

As $C_2$–$C_{10}$alkylene, $C_6$–$C_{15}$arylene or $C_6$–$C_{12}$cycloalkylene, D is as defined under b).

The following compounds are examples of polyalkylpiperidine compounds of this class:

56) 3-Benzyl-1,3,8-triaza-7,7,9,9-tetramethylspiro[4.5]-decane-2,4-dione
58) 3-Allyl-1,3,8-triaza-1,7,7,9,9-pentamethylspiro[4.5]-decane-2,4-dione
59) 3-Glycidyl-1,3,8-triaza-7,7,8,9,9-pentamethylspiro[4.5]decane-2,4-dione
60) 1,3,7,7,8,9,9-Heptamethyl-1,3,8-triazaspiro[4.5]decane-2,4-dione
61) 2-Isopropyl-7,7,9,9-tetramethyl-1-oxa-3,8-diaza-4-oxospiro[4.5]-decane
62) 2,2-Dibutyl-7,7,9,9-tetramethyl-1-oxa-3,8-diaza-4-oxospiro[4.5]-decane
63) 2,2,4,4-Tetramethyl-7-oxa-3,20-diaza-21-oxodispiro[5.1.11.2]-heneicosane
64) 2-Butyl-7,7,9,9-tetramethyl-1-oxa-4,8-diaza-3-oxospiro[4.5]decane
65) 8-Acetyl-3-dodecyl-1,3,8-triaza-7,7,9,9-tetramethylspiro[4.5]-decane-2,4-dione or the compounds of the following formulae:

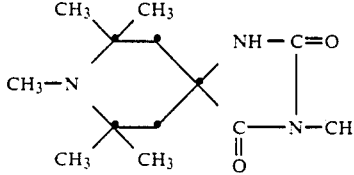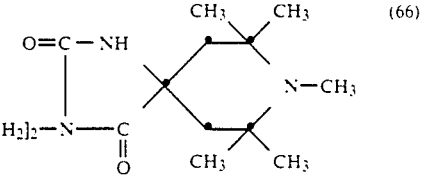
(66)

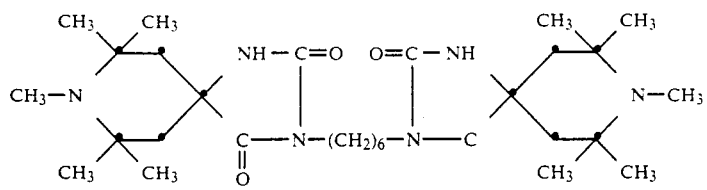
(67)

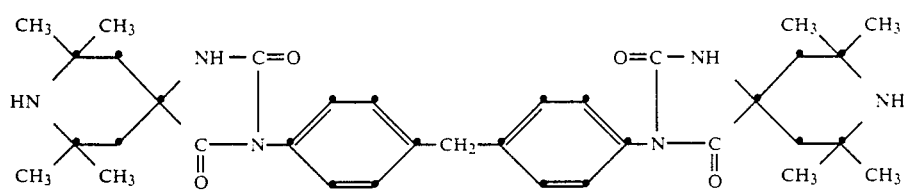
(68)

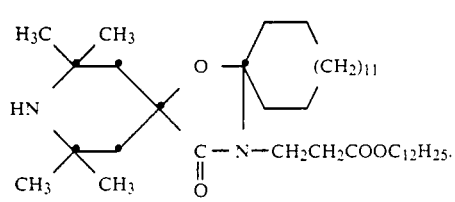
(69)

e) Compounds of the formula VI

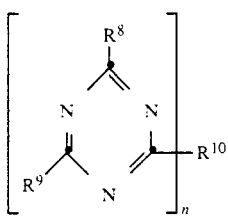 (VI)

in which n is the number 1 or 2 and $R^8$ is a group of the formula

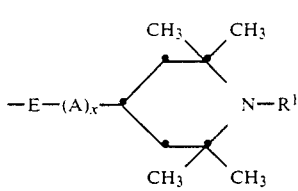

in which $R^1$ is as defined under a), E is —O— or —NR$^{11}$—, A is $C_2$–$C_6$-alkylene or —(CH$_2$)$_3$—O— and x is the numbers 0 or 1, $R^9$ is the same as $R^8$ or is one of the groups —NR$^{11}$R$^{12}$, —OR$^{13}$, —NHCH$_2$OR$^{13}$ or —N(CH$_2$OR$^{13}$)$_2$, and, if n is 1, $R^{10}$ is the same as $R^8$ or $R^9$, and, if n is 2, $R^{10}$ is a group —E—B—E— in which B is $C_2$–$C_6$alkylene which is uninterrupted or interrupted by —N($R^{11}$)—, $R^{11}$ is $C_1$–$C_{12}$alkyl, cyclohexyl, benzyl or $C_1$–$C_4$hydroxyalkyl or a group of the formula

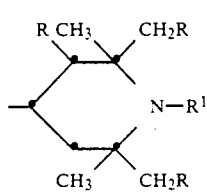

$R^{12}$ is $C_1$–$C_{12}$alkyl, cyclohexyl, benzyl or $C_1$–$C_4$hydroxyalkyl and $R^{13}$ is hydrogen, $C_1$–$C_{12}$alkyl or phenyl, or $R^{11}$ and $R^{12}$ together are $C_4$–$C_5$alkylene or $C_4$–$C_5$oxaalkylene, for example

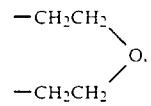

or a group of the formula

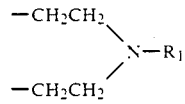

or $R^{11}$ and $R^{12}$ are each a group of the formula

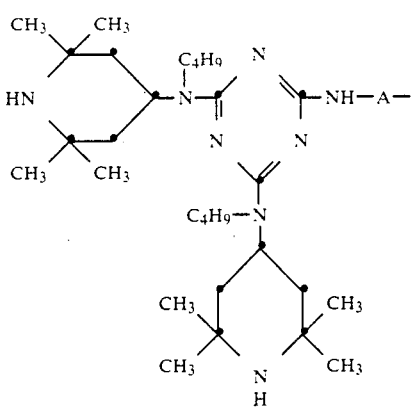

If any substituents are $C_1$–$C_{12}$alkyl, they are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

If any substituents are $C_1$–$C_4$hydroxyalkyl, they are, for example, 2-hydroxyethyl, 2-hydroxypropyl, 3-hydroxypropyl, 2-hydroxybutyl or 4-hydroxybutyl.

Examples of A as $C_2$-$C_6$alkylene are ethylene, propylene, 2,2-dimethylpropylene, tetramethylene or hexamethylene.
If $R^{11}$ and $R^{12}$ together are $C_4$-$C_5$alkylene or $C_4$-$C_5$oxaalkylene, this is, for example, tetramethylene, pentamethylene or 3-oxapentamethylene.
The compounds of the following formulae are examples of polyalkylpiperidine compounds of this class:
(70)
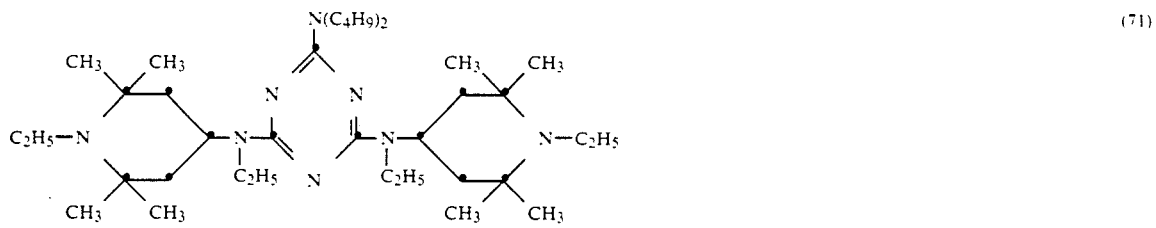
(71)
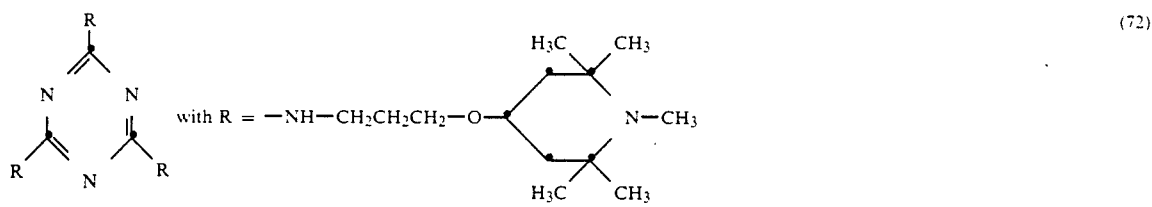
(72)
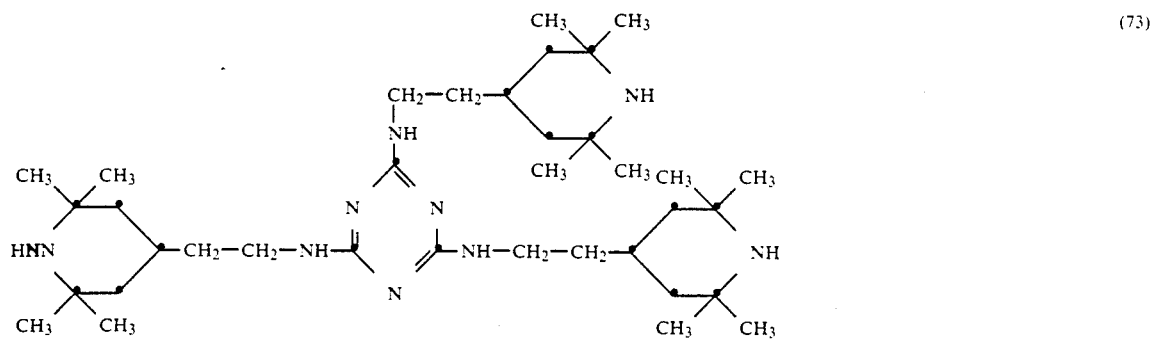
(73)

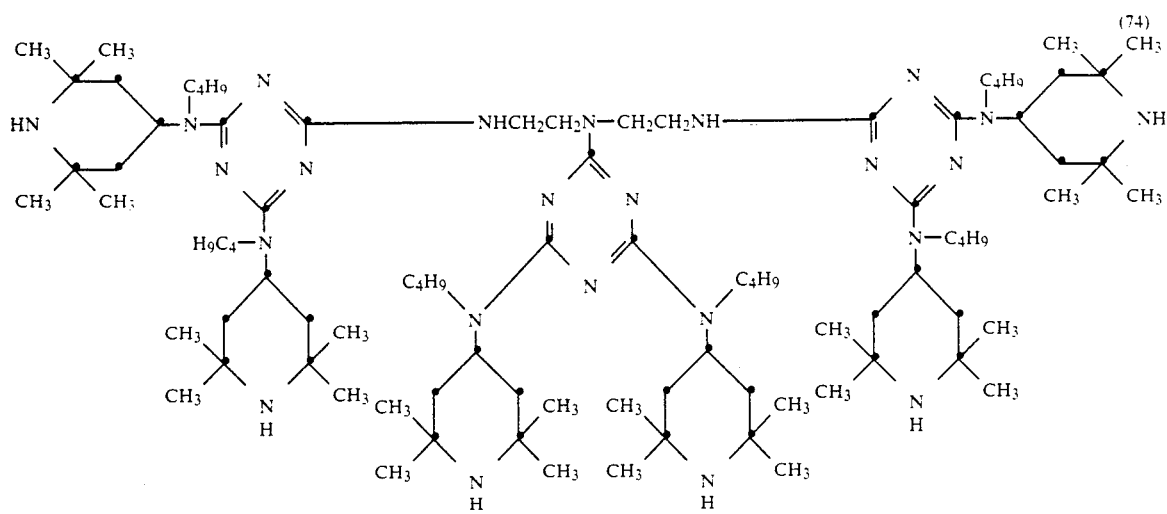
(74)
(75)
with R =
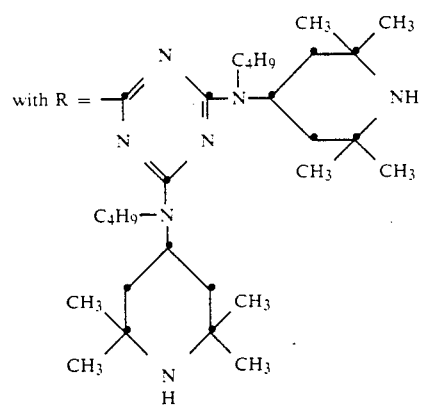
(76)
with R =
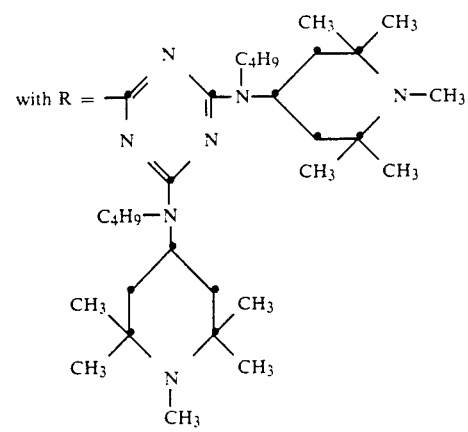
(77)

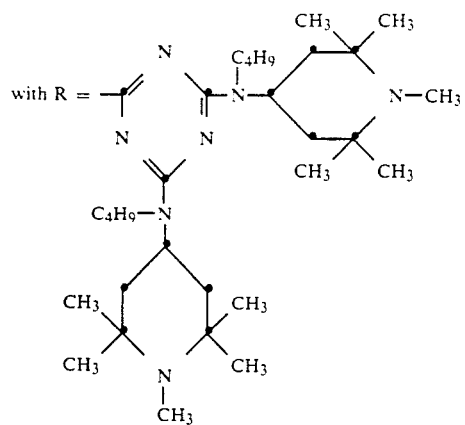

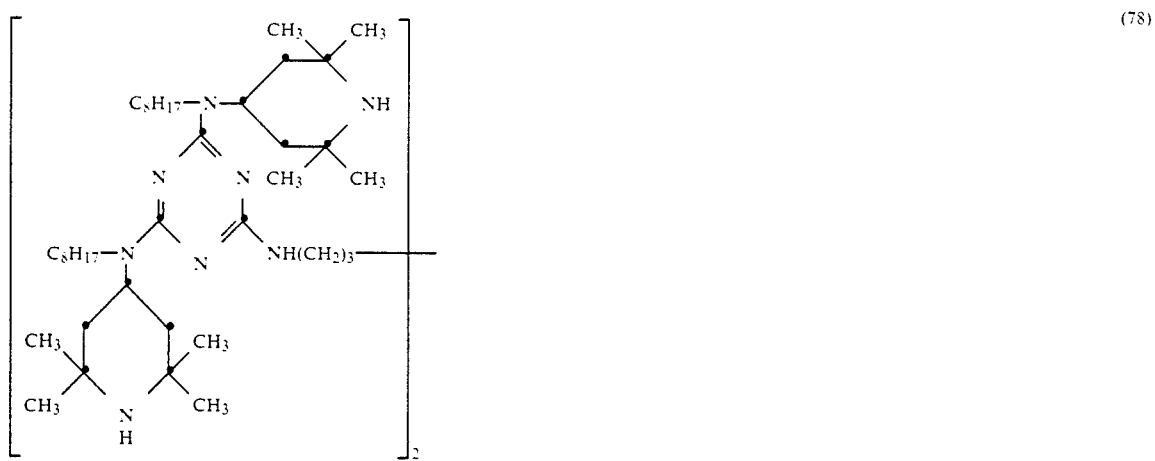
(78)

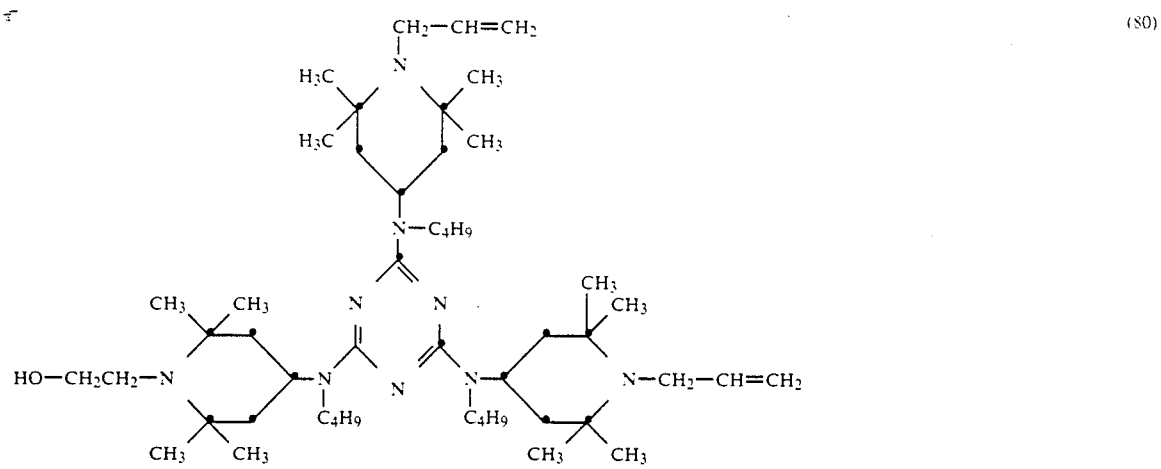
(80)

f) Oligomeric or polymeric compounds in which the recurring structural unit contains a 2.2,6,6-tetraalkylpiperidine radical of the formula (I), in particular polyesters, polyethers, polyamides, polyamines, polyurethanes, polyureas, polyaminotriazines, poly(meth)acrylates, poly(meth)acrylamides and copolymers thereof containing radicals of this type.

The compounds of the following formulae in which m is a number from 2 to about 200 are examples of 2,2,6,6-polyalkylpiperidine light stabilizers of this class.

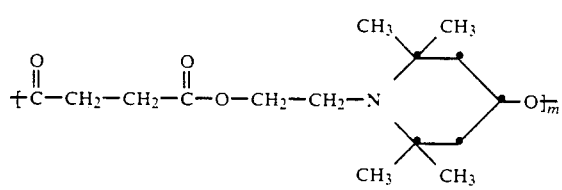
(81)

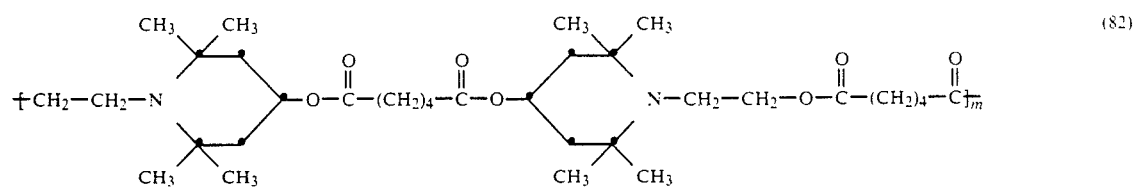
(82)
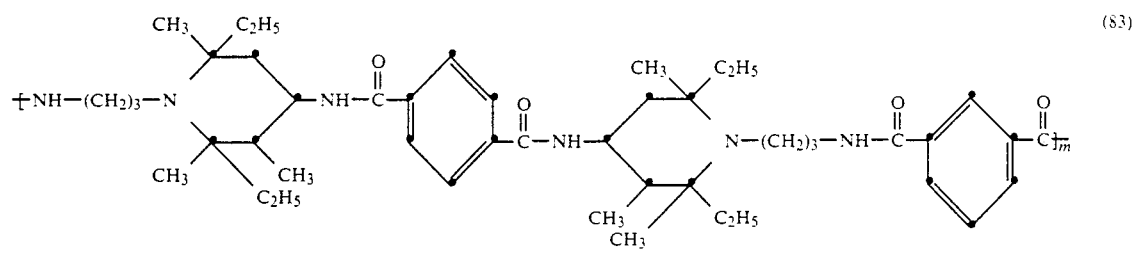
(83)
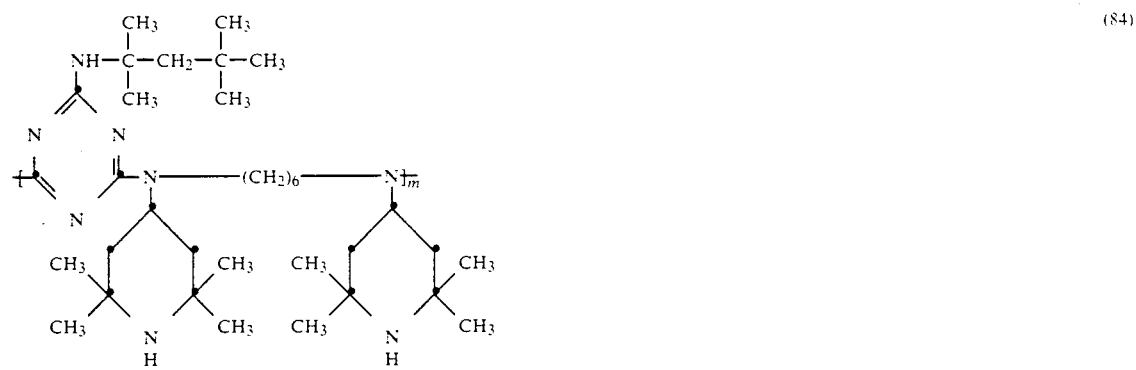
(84)
(85)
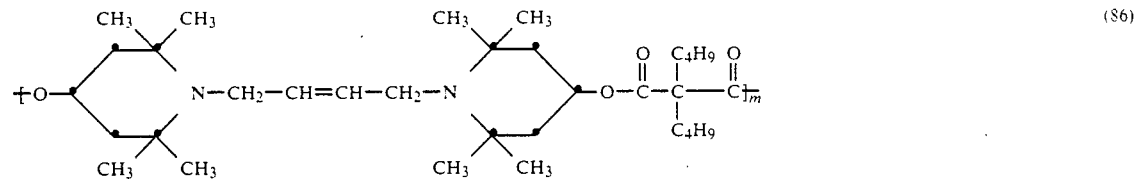
(86)
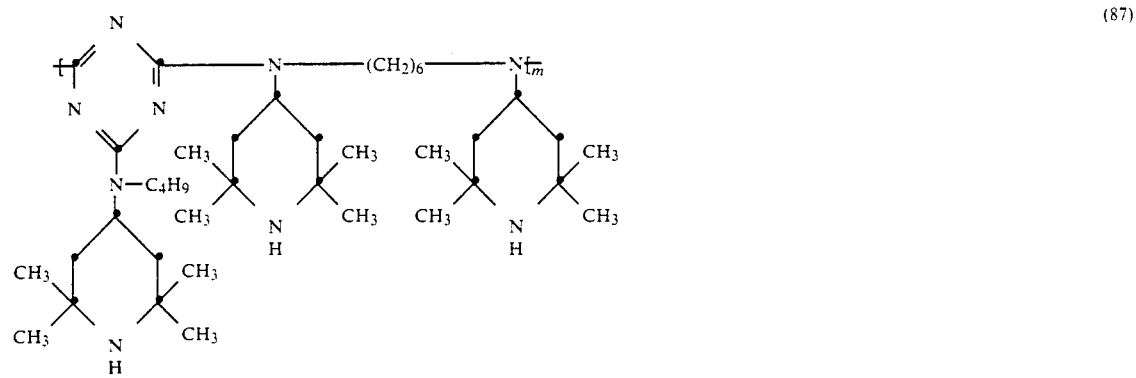
(87)

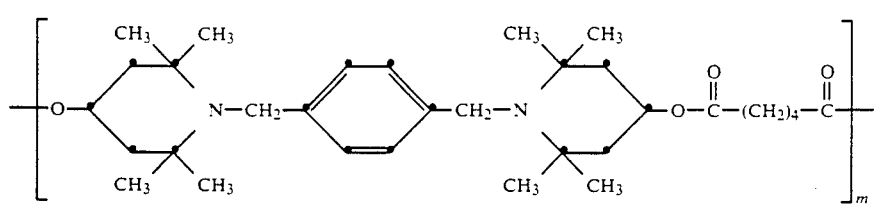
(88)
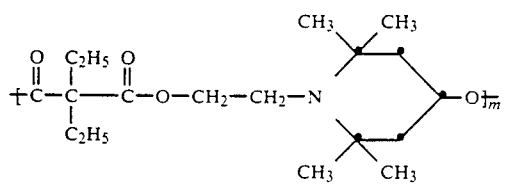
(89)
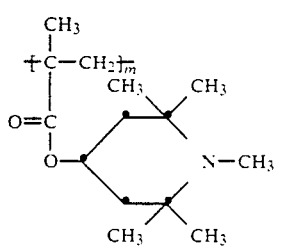
(90)
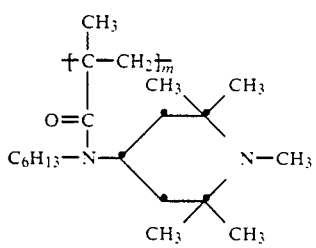
(91)
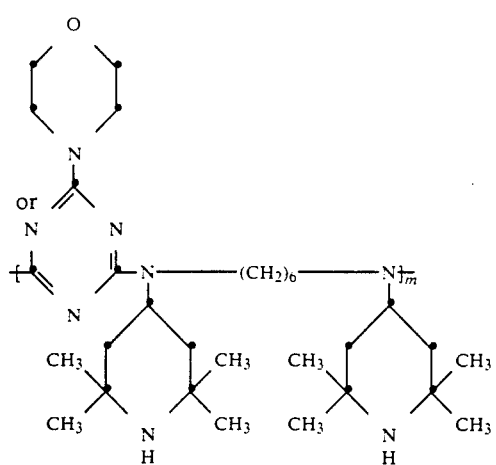
(92)
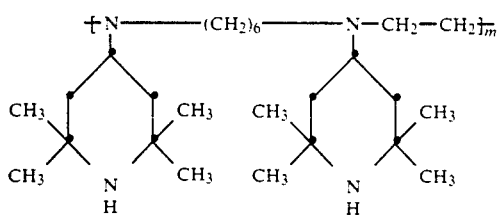
(93)

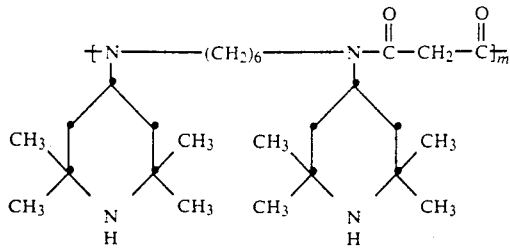

(94)

Amongst these classes, classes e) and f) are particularly suitable, especially tetralkylpiperidine compounds containing s-triazine groups. The compounds 74, 76, 84, 87 and 92 are particularly suitable.

The amount of the added tetramethylpiperidine compound depends on the degree of stabilization desired. In general, 0.01 to 5% by weight, in particular 0.05 to 1% by weight, relative to the polymer, is added. Preferably the molar ratio of tetramethylpiperidine and aluminium alkyl should not exceed 1.

The phosphorus-III esters added to the polymerization in accordance with the invention as costabilizers can be phosphites, phosphonites or phosphinites. They can contain one or more phosphorus ester groups. It is preferable to use a phosphorus-III ester of the formula A, B or C

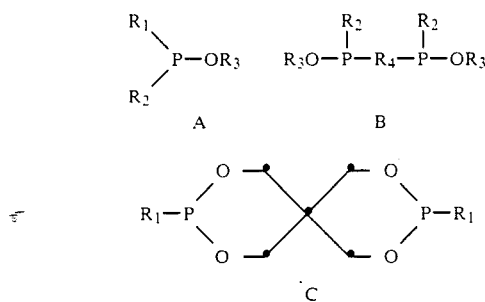

in which $R_1$ and $R_2$ independently of one another are $C_1$-$C_{12}$alkyl, $C_5$-$C_8$cycloalkyl, $C_6$-$C_{12}$aryl, phenyl which is substituted by one to three $C_1$-$C_{12}$alkyl groups, or a radical —$OR_3$, $R_3$ is $C_6$-$C_{20}$-alkyl, $C_5$-$C_8$-cycloalkyl, $C_6$-$C_{12}$aryl or phenyl which is substituted by one to three $C_1$-$C_{12}$alkyl groups, and $R_4$ is $C_6$-$C_{14}$arylene which is unsubstituted or substituted by $C_1$-$C_{12}$alkyl, or is a radical —O—$R_5$—O— in which $R_5$ is $C_6$-$C_{14}$arylene which is unsubstituted or substituted by $C_1$-$C_{12}$alkyl or is a radical -phen-$R^6$-phen in which phen is phenylene and $R_6$ is —O—, —S—, —$SO_2$—, —$CH_2$— or —$C(CH_3)_2$—.

Amongst the compounds of the formula A, it is preferable to use those in which $R_1$ and $R_2$ are a radical —$OR_3$ and $R_3$ is $C_6$-$C_{20}$alkyl, phenyl or phenyl which is substituted by one to two $C_1$-$C_{12}$alkyl groups.

Amongst the compounds of the formula B, it is preferable to use those in which $R_2$ is a group —$OR_3$, $R_3$ is phenyl or phenyl which is substituted by one to two $C_1$-$C_{12}$alkyl groups and $R_4$ is a biphenylene radical.

Amongst the compounds of the formula C, it is preferable to use those in which $R_1$ is a radical —$OR_3$ and $R_3$ is phenyl or phenyl which is substituted by one to three $C_1$-$C_{12}$alkyl groups.

It is preferable to use a phosphorus-III ester containing at least one group P—O—Ar in which Ar is a monoalkylphenyl or dialkylphenyl radical.

The following are examples of phosphorus-III esters which can be used: triphenyl phosphite, decyldiphenyl phosphite, phenyldidecyl phosphite, tris-(nonylphenyl) phosphite, trilauryl phosphite, trioctadecyl phosphite, distearylpentaerythritol diphosphite, tris-(2,4-di-tert-butyl-phenyl) phosphite, diisodecylpentaerythritol diphosphite, bis-(2,4-di-tert-butylphenyl)-pentaerythritol diphosphite, tristearylsorbitol triphosphite, tetrakis-(2,4-di-tert-butylphenyl) 4,4'-biphenylenediphosphonite and bis-(2,6-di-tert-butyl-4-methylphenyl)-pentaerythritol diphosphite.

The amount of phosphorus-III ester added depends on the amount of piperidine compound added. In general, 0.01 to 1% by weight, in particular 0.05 to 0.5% by weight, relative to the polymer, is used.

In addition to the phosphorus-III ester, it is possible to employ further co-stabilizers and additives which do not interfere with the polymerization process, in particular antioxidants of the sterically hindered phenol type can be added to the polymerization. These phenols are generally known as antioxidants for organic materials and are frequently used for the stabilization of polymers. The following are examples of such phenol antioxidants:

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-ter-butyl-4-i-butylphenol, 2,6-di-cyclopentyl-4-methylphenol, 2-($\alpha$-methylcyclohexyl-4,6-dimethylphenol, b 2,6-di-octadecyl-4-methylphenol, 2,4,6-tri-cyclohexylphenol, 2,6-di-tert-butyl-4-methoxymethylphenol, 2,6-dinonyl-4-methylphenol.

2. Alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4-octadecyloxyphenol.   by   which 3. Hydroxylated thiodiphenyl ethers, for example 2,2'-thio-bis-(6-tert-butyl-4-methylphenol), 2,2'-thio-bis-(4-octylphenol), 4,4'-thio-bis-(6-tert-butyl-3-methylphenol), 4,4'-thio-bis-(6-tert-butyl-2-methylphenol).

4. Alkylidenebisphenols, for example 2,2'-methylene-bis-(6-tert-butyl4-methylphenol), 2,2'-methylene-bis-(6-tert-butyl-4-ethylphenol, 2,2'-methylene-bis-[4-methyl-6-($\alpha$-methylcyclohexyl)-phenol], 2,2'-methylene-bis-(4-methyl-6-cyclohexylphenol), 2,2'-methylene-bis-(6-nonyl-4-methylphenol), 2,2'-methylene-bis-(4,6-di-tert-butylphenol), 2,2'-ethylidene-bis-(4,6-di-tert-butylphenol), 2,2'-ethylidene-bis-(6-tert-butyl-4-isobutylphenol), 2,2'-methylene-bis-[6-($\alpha$-methylbenzyl)-4-nonylphenol], 2,2'-methylene-bis-[6-($\alpha$,$\alpha$-dimethylbenzyl)-4-nonylphenol], 4,4'-methylene-bis-(2,6-di-tert-butylphenol), 4,4'-methylene-bis-(6-tert-butyl-2-methylphenol), 1,1-bis-(5-tert-butyl-4-hydroxy-2-methylphenyl)-butane, 2,6-bis-(3-tert-butyl-5-methyl-2-hydroxybenzyl)-4-methylphenol, 1,1,3-tris-(5-tert-butyl-4-hydroxy-2-methylphenyl)butane, 1,1-bis-(5-tertbutyl-4-hydroxy-2-methylphenyl)-3-n-dodecylmercaptobutane, ethylene glycol bis-[3,3-bis-(3'-tert-butyl-4'-hydroxy phenyl) butyrate], bis-(3-tert-butyl-4-hydroxy-5-methylphenyl)-dicyclo pentadiene, bis-[2-(3'-tert-butyl-2'-hydroxy-5'-methylbenzyl)-6-tertbutyl-4-methylphenyl]-terephthalate.

5. Benzyl compounds, for example 1,3,5-tris-(3,5-di-tert-butyl-4-hydroxybenzyl)-2,4,6-trimethylbenzene, bis-(3,5-di-tert-butyl-4-hydroxybenzyl) sulfide, isooctyl 3,5-di-tert-butyl-4-hydroxybenzylmercaptoacetate, bis-(4-tert-butyl-3-hydroxy-2,6-dimethylbenzyl)dithiol-terephthalate, 1,3,5-tris-(3,5-di-tert-butyl-4-hydroxybenzyl) isocyanurate, 1,3,5-tris-(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate 1,3,5-tris-(3,5-dicyclohexyl-4-hydroxybenzyl) isocyanurate.

6. Acylaminophenols, for example anilide of 4-hydroxylauric acid, anilide of 4-hydroxystearic acid, 2,4-bis-(octylmercapto)-6-(3,5-di-tert-butyl-4-hydroxyanilino)-s-triazine, octyl N-(3,5-di-tert-butyl-4-hydroxyphenyl)-carbamate.

7. Esters of β-(3,5-di-tert-butyl-4-hydroxyphenyl)-propionic acid with mono- or polyhydric alcohols, e.g. with methanol, octadecanol, 1,6-hexanediol, neopentylglycol, thiodiethylene glycol, diethylene glycol, triethylene glycol, pentaerythritol, tris-(hydroxyethyl) isocyanurate, N,N'-bis-(hydroxyethyl)-oxalic acid diamide.

8. Esters of β-(5-tert-butyl-4-hydroxy-3-methylphenyl)-propionic acid with mono- or polyhydric alcohols, e.g. with methanol, octadecanol, 1,6-hexanediol, neopentylglycol, thiodiethylene glycol, diethylene glycol, triethylene glycol, pentaerythritol, tris-(hydroxy)-ethyl isocyanurate, N,N'-bis-(hydroxyethyl)-oxalic acid diamide.

9. Esters of β-(3,5-dicyclohexyl-4-hydroxyphenyl)-propionic acid with mono- or polyhydric alcohols, e.g. with methanol, octadecanol, 1,6-hexanediol, neopentylglycol, thiodiethylene glycol, diethylene glycol, triethylene glycol, pentaerythritol, tris-(hydroxy)ethyl isocyanurate, N,N'-bis-(hydroxyethyl)-oxalic acid diamide.

10. Amides of β-(3,5-di-tert-butyl-4-hydroxyphenyl)-propionic acid e.g. N,N'-bis-(3,5-di-tert-butyl-4-hydroxyphenylpropionyl)-hexamethylenediamine, N,N'-bis-(3,5-di-tert-butyl-4-hydroxyphenylpropionyl)-trimethylenediamine, N,N'-bis-(3,5-di-tert-butyl-4-hydroxyphenylpropionyl)-hydrazine.

The amount of antioxidant added depends on the amount of the phosphorus-III ester. In general, 0.005 to 0.5% by weight, in particular 0.01 to 0.2% by weight, relative to the polymer, are added.

The following examples illustrate the process in greater detail, without limiting the invention to the examples. In these examples parts and percentages are by weight, unless stated otherwise.

Example 1 - The polymerization of propylene

The polymerization is carried out in a thermostatically controlled 3 l stirred autoclave made of stainless steel, which is dried before the start of the polymerization by flushing it for one hour with propylene gas at 70° C. The preparation of the solid catalyst component from spherical $MgCl_2$ and $TiCl_4$ is carried out as described in Example 3 of DE-A 2,933,997, using 9.2 m Mole of diisobutyl phthalate in place of 21.6 m Mole of ethyl benzoate. 10 mg of this catalyst component are suspended in 25 ml of n-hexane, containing 5 m Mole of triethylaluminium and 0.2 m Mole of diphenyldimethoxysilane and are introduced with an overpressure of argon into the 3 l autoclave containing 700 g liquid propylene and an overpressure 0.2 bar of hydrogen. The mixture is heated to 70° C., with stirring, and is kept at this temperature for 2 hours. The excess propylene is then flushed and the resulting polymer is treated with steam at 100° C. for 10 minutes and is then dried at 50° C. for 8 hours. The polymer consists of spherical particles. The polymer is examined in the following respects:

The catalyst activity (g of polymer/g of catalyst) is calculated from the Mg content determined by atomic absorption and from the polymer yield.

The isotacticity is determined as the percentage proportion of the polymer which is insoluble in xylene at room temperature. This is effected by dissolving the polymer in hot xylene and filtering off the insoluble fraction after cooling and drying it to constant weight.

The morphology of the polymer is assessed qualitatively by visual means in order to determine whether agglomeration has taken place.

The colour of the polymer is characterized by the Yellowness Index as specified in ASTM D 1925-70.

The intrinsic viscosity [η] in tetrachloroethylene at 135° C, is determined as an indirect measure of the molecular weight, and the melt flow index is also determined according to method ASTM D 1238 (2.16 kg/230° C.).

The stability to oxidative degradation is determined by the time required for appreciable embrittlement of the polymer when subjected to oven ageing at an elevated temperature. This test is carried out on panels prepared by compression moulding at 220° C.

The following values are obtained for the unstabilized polypropylene described above:

| Catalyst activity | 45.5 kg/g |
| --- | --- |
| Isotacticity | 97.0% |
| Intrinsic viscosity | 1.8 dl/g |
| Morphology | spherical |
| Melt flow index | 15 g/10 min |
| Yellowness Index | 4.5 |
| Oven ageing of panels | at 135° C.: 0.75 hour |
| | at 150° C.: 0.50 hour | is the following stabilizers are used in the examples below:

a) Piperidine derivatives

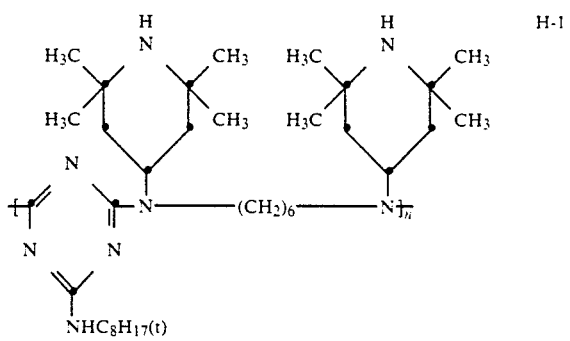

n = 5-6 b) Phosphorus compounds

Tris-(2,4-di-tert-butylphenyl) phosphite  P-1

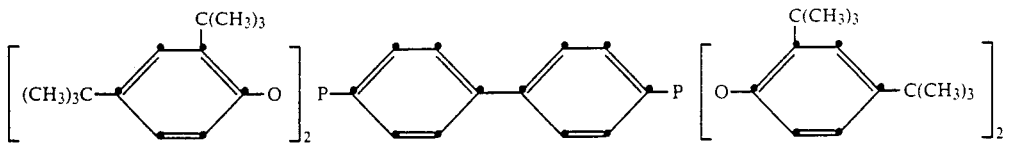

Tetrakis-(2,4-di-tert-butylphenyl)-4,4′-biphenylenediphophonite  P-2 c) Antioxidants

AO-1 Octadecyl β-(3,5-di-tert-butyl-4-hydroxyphenyl)-propionate
AO-2 2,6-Di-(tert-butyl)-4-octadecylphenol
AO-3 Tris-(3,5-di-tert-butyl-4-hydroxybenzyl) isocyanurate
AO-4 1,1,3-Tris-(2-methyl-4-hydroxy-5-tert-butyl)-butane.

Examples 2-4

The procedure is as in Example 1. 10 minutes after the start of polymerization, a solution, in 100 ml of hexane, of the stabilizers indicated in Table 1 is injected into the autoclave. In Example 3 and 4 a third of the activator is added in mixture with the stabilizers.

TABLE 1

|  | Example | | |
|---|---|---|---|
|  | 2 | 3 | 4 |
| Piperidine derivative | 0.50 g H-1 | 0.36 g H-1 | 0.36 g H-1 |
| Phosphorus compound | 0.34 g P-1 | 0.36 g P-1 | 0.40 g P-1 |
| Antioxidant | — | 0.18 g AO-1 | 0.18 g AO-2 |

The products obtained after polymerization for 2 hours have the properties shown in Table 2.

TABLE 2

|  | Example | | |
|---|---|---|---|
|  | 2 | 3 | 4 |
| Catalyst activity (kg/g) | 44 | 45.5 | 42 |
| Isotacticity (%) | 97.1 | 96.6 | 96.8 |
| Intrinsic viscosity (dl/g) | 1.90 | 1.80 | 1.90 |
| Morphology | (*) | (*) | (*) |
| Melt flow index (g/10 min) | 8.7 | 6.4 | 5.3 |
| Yellowness Index | 2.5 | 4.1 | 3.7 |
| Oven ageing | | | |
| 135° C. (hours) | 240 | 200 | 222 |
| 150° C. (hours) | 70 | 30 | 48 |

(*) as in Example 1

Examples 5-7

The procedure is as in Example 2, the stabilizers listed in Table 3 being added. The properties of the resulting polymers are shown in Table 4.

TABLE 3

|  | Example | | |
|---|---|---|---|
|  | 5 | 6 | 7 |
| Piperidine derivative | 0.36 g H-1 | 0.39 g H-1 | 0.45 g H-1 |
| Phosphorus compound | 0.36 g P-1 | 0.39 g P-2 | 0.45 g P-2 |
| Antioxidant | 0.18 g AO-3 | 0.20 g AO-3 | 0.22 g AO-4 |

TABLE 4

|  | Example | | |
|---|---|---|---|
|  | 5 | 6 | 7 |
| Catalyst activity (kg/g) | 45.5 | 45.5 | 45.5 |
| Isotacticity (%) | 97.2 | 96.9 | 97.1 |
| Intrinsic viscosity (dl/g) | 1.90 | 1.90 | 1.85 |
| Morphology | (*) | (*) | (*) |
| Oven ageing of panels 150° C. (days) | 4 | 4 | 9 |

(*)as in Example 1

What is claimed is:

1. A process for the preparation of olefin polymers stable to heat and oxidation by polymerization on a solid catalyst obtained by reaction of an aluminium alkyl with a solid product comprising a magnesium dihalide in active form and a titanium compound, which process comprises adding to the polymerization zone at least one 2,2,6,6-tetramethylpiperidine compound as a stabilizer and at least one phosphorus-III ester as a costabilizer.

2. A process according to claim 1, which comprises adding as the additional co-stabilizer an antioxidant of the sterically hindered phenol type.

3. A process according to claim 1, wherein the catalyst comprises at least one electron donor compound.

4. A process according to claim 3, wherein the electron donor is a carboxylic acid ester.

5. A process according to claim 3, wherein the electron donor used is an organic silicon compound having at least one Si—O—C bond.

6. A process according to claim 1, wherein the magnesium dihalide is magnesium dichloride and the titanium compound is titanium tetrachloride.

7. A process according to claim 1, wherein the stabilizer used is a compound the molecule of which contains both at least one 2,2,6,6-tetramethylpiperidine group and at least one s-triazine group.

8. A process according to claim 7, wherein the stabilizer used is a compound of formula

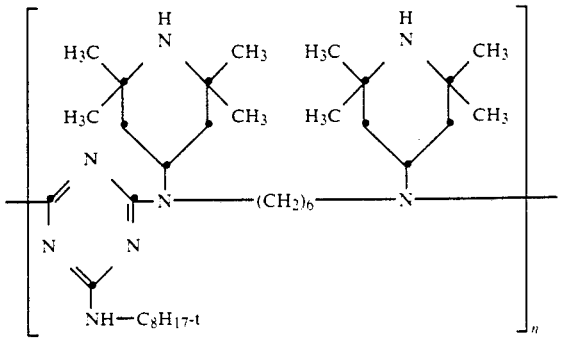

wherein n is 4 to 10.

9. A process according to claim 1, wherein the co-stabilizer used is a phosphorus-III ester which contains at least one group P—O—Ar, Ar being a monoalkylphenyl or dialkylphenyl radical.

10. A process according to claim 1, wherein the co-stabilizer used is tris-(2,4-di-tert-butylphenyl) phosphite.

11. A process according to claim 1, wherein the co-stabilizer used is tetrakis-(2,4-di-tert-butylphenyl)-4,4'-biphenylenediphosphonite.

12. A process according to claim 2, wherein octadecyl β-(3,5-di-tert-butyl-4-hydroxyphenyl)-propionate is used as the additional co-stabilizer.

13. A stabilized polyolefin which has been prepared by the process of claim 1.

14. A stabilized polypropylene according to claim 13.

* * * * *